O. Nicholson,
Hat Hook.

No. 92,344.  Patented July 6, 1869.

Witnesses:
A. W. Almquist
O. Hinchman

Inventor:
Oscar Nicholson
per Munn &
Attorneys

United States Patent Office.

OSCAR NICHOLSON, OF NEW YORK, N. Y.

Letters Patent No. 92,344, dated July 6, 1869.

IMPROVED LOCKING WARDROBE-HOOK.

The Schedule referred to in these Letters Patent and making part of the same

*To all whom it may concern:*

Be it known that I, OSCAR NICHOLSON, of the city, county, and State of New York, have invented a new and improved Lock Wardrobe-Hook; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved wardrobe-hook for holding clothing in halls, offices, and other places to which others besides the owner of said clothes have access, which shall be so constructed and arranged that it may be securely locked, to secure the clothing from being carried off; and It consists in the construction and combination of the various parts of the hook, as hereinafter more fully described.

A is the stationary part of the hook, the base of which is securely attached to the wall, or other support.

Figure 1:
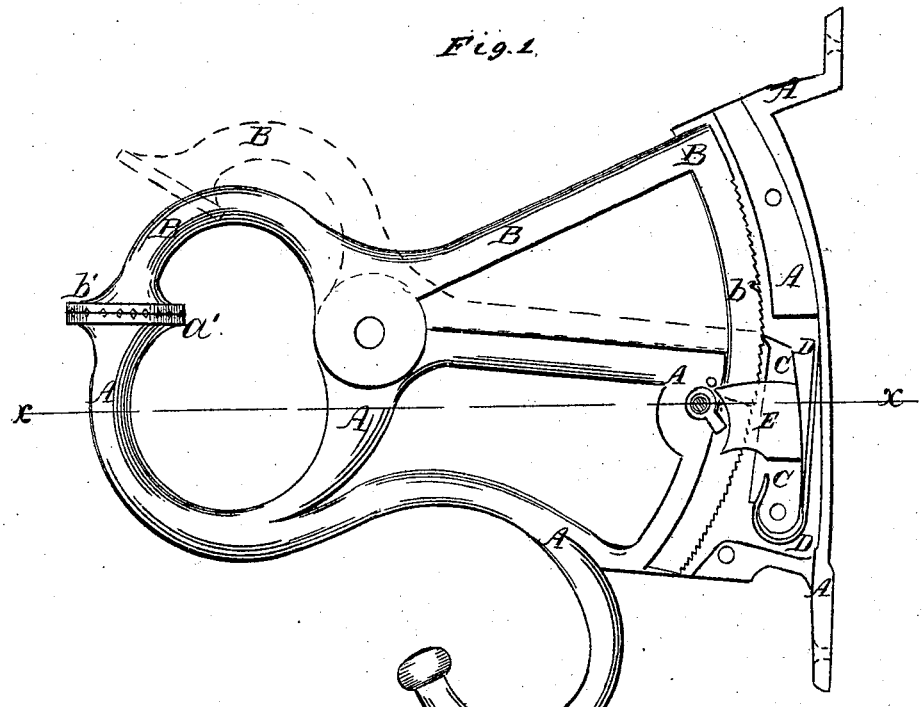
Figure 1 is a side view of my improved lock wardrobe-hook, the cap-plate being removed.
Figure 2:
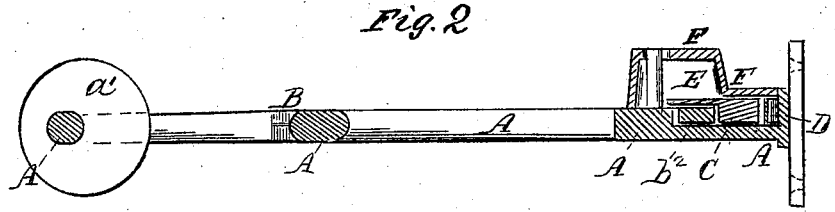
Figure 2 is a detail sectional view of the same, taken through the line $x\ x$, fig. 1.

B is the movable part of the hook, which is pivoted to the stationary part A, as shown in fig. 1.

Upon the forward ends of the parts A and B are formed heads or jaws $a'\ b'$, which, when the hook is locked, clamp the clothing between them, holding it securely.

Upon the rear end of the part B is formed a curved arm, $b^2$, having ratchet-teeth formed upon its rear or convex side, as shown in fig. 1, and which enters a groove in the base of the part A.

The lower part of this groove is enlarged into a chamber to receive the pawl C, which is pivoted to the part A, and is held forward by the spring D, so that its forward or working-end may take hold of the teeth of the arm $b^2$ and prevent the parts A and B from being opened without first raising the said pawl C from the said arm $b^2$, thus securely locking the hook.

E is a guard attached to the pawl C, and projecting forward into such a position that it may be reached and operated by the key.

By varying the thickness and length of the guard E, an unlimited number of changes may be produced, so that each hook can only be unlocked with its own key.

F is the cap-plate, which is formed with an outwardly-projecting chamber of sufficient size to receive the key, and allow it to be turned far enough to raise the pawl C from the toothed arm $b^2$, to allow the hook to be opened to release the clothing, the pawl and toothed arm being so constructed as to slide over each other as the hook is being closed, locking the hook automatically.

Having thus described my invention,

What I claim as new, and desire to secure by Letters Patent, is—

The combination of the parts A and B, constructed substantially as described, toothed arm $b^2$, pawl C, spring D, and guard E, with each other, substantially as herein shown and described, and for the purpose set forth.

The above specification of my invention signed by me, this 11th day of May, 1869.

OSCAR NICHOLSON.

Witnesses:
FRANK BLOCKLEY,
JAMES T. GRAHAM.